(12) United States Patent
Hussain et al.

(10) Patent No.: US 6,172,611 B1
(45) Date of Patent: Jan. 9, 2001

(54) INDEPENDENT HARDWARE THERMAL SENSING AND MONITORING

(75) Inventors: M. Abid Hussain, Cupertino; Amado Caliboso, Sunnyvale; Quoi Huynh, San Jose, all of CA (US)

(73) Assignee: TelCom Semiconductor, Inc., Mountain View, CA (US)

(*) Notice: Under 35 U.S.C. 154(b), the term of this patent shall be extended for 0 days.

(21) Appl. No.: 09/174,896

(22) Filed: Oct. 19, 1998

(51) Int. Cl.[7] .................................................. G08B 17/00
(52) U.S. Cl. ........................ 340/584; 340/588; 713/323; 713/324
(58) Field of Search ....................... 340/584, 588, 340/653, 655, 595; 713/323, 322, 501, 310, 330, 324, 340; 710/18; 361/679, 683

(56) References Cited

U.S. PATENT DOCUMENTS

| | | | |
|---|---|---|---|
| 5,713,030 | * 1/1998 | Evoy | 340/584 |
| 5,920,264 | * 7/1999 | Kim et al. | 340/584 |
| 5,978,864 | * 11/1999 | Hetherington et al. | 713/340 |
| 5,996,084 | * 11/1999 | Watts | 713/323 |

* cited by examiner

Primary Examiner—Daniel J. Wu
Assistant Examiner—Anh La
(74) Attorney, Agent, or Firm—Skjerven Morrill MacPherson LLP; Brian D. Ogonowsky; Michael P. Noonan (57) ABSTRACT

An apparatus for monitoring a thermal state of a system includes a thermal management integrated circuit (IC). The thermal management IC is coupled to receive a remote temperature signal. The remote temperature signal is indicative of a system temperature. The thermal management IC includes a software programmable temperature threshold setpoint, and a hardware programmable temperature critical threshold setpoint.

25 Claims, 5 Drawing Sheets

INDEPENDENT HARDWARE THERMAL SENSING AND MONITORING

BACKGROUND

1. Field of the Invention

The present invention relates to temperature monitoring techniques used in electrical and/or information processing systems such as computer systems and microprocessors.

2. Description of the Related Art

High temperatures may subject electrical and/or information processing systems to a thermal runaway condition resulting in failure of one or more electronic components of such systems. For example, information processing systems often include one or more microprocessors which can be damaged by high temperatures. Such component failure often results in expensive repair or replacement of the components or of the entire system. Proper temperature monitoring is therefore critical to the continued operation of such systems, and great importance is placed on early detection of potentially damaging heat buildup.

Modern information processing systems such as computer systems and/or microprocessors often include temperature monitoring devices. For example, personal computer systems including the Pentium™ microprocessor or Pentium II™ microprocessor available from Intel Corporation of Santa Clara, Calif. often include temperature monitoring devices because the Pentium™ microprocessor or Pentium II™ microprocessor generates enough heat that thermal monitoring is required to prevent expensive failures. Real-time monitoring is especially important because of the possibility that changing ambient conditions such as in portable computer systems may increase the likelihood of thermal overload. Subsequent higher performance generations of microprocessors have dramatically exacerbated the problem of possible thermal overload.

A personal computer industry standard specification known as the Advanced Configuration and Power Management Initiative (ACPI) has been developed to outline requirements for thermal management. ACPI version 1.0 dictates that there be four thermal states: "none," "passive," "active," and "critical." In a personal computer system a "none" thermal state indicates that the thermal situation requires no special action. A "passive" thermal state typically indicates, for example, that the microprocessor(s) should be slowed down to reduce the thermal load. An "active" thermal state indicates that a fan or some other active cooling device be started. A "critical" thermal state indicates that the system is in thermal runaway and must be shut down immediately to prevent damage. ACPI also allows a software operating system to control the setting of temperature thresholds to determine the limits of the four prescribed thermal zones or levels. However, if the operating system crashes or malfunctions, the temperature of the hardware system could become unmonitored, and the computer system could become vulnerable to thermal damage.

In one temperature monitoring technique, an information processing system includes a hardware programmable thermal management integrated circuit (IC) having an on-chip, solid state temperature sensor embedded in its silicon die. The sensor senses the temperature of its own die and outputs a signal based on the sensed temperature value. Typically the thermal management IC will have one or more hardware programmable (e.g., external resistor programmed) temperature thresholds to implement the above discussed thermal zones. Using such a thermal management IC provides the advantage of an inherent reliability in that erroneous software operation does not jeopardize the thermal protection. One disadvantage to using such an IC is that the thermal management IC must be placed physically close to key integrated circuits such as a CPU for thermal coupling because the temperature sensing element is on the thermal management IC. This can be inconvenient and sometimes impossible. Another disadvantage is that this type of device is not software programmable and is therefore not in compliance with the ACPI specification.

In another temperature monitoring technique, an information processing system includes a software programmable thermal management IC having an on-chip solid state temperature sensor. Such an implementation typically includes a serial port whereby the system software can access temperature data and manipulate temperature thresholds on the fly. Such an implementation advantageously allows the system to intelligently respond to changing conditions. Also, the system may be in compliance with the ACPI specification if there are enough thresholds available to define all of the prescribed thermal levels. However, the thermal management IC also must be located so that there is a good thermal coupling to the CPU because the temperature sensing element is on the thermal management IC.

In another temperature monitoring technique, an information processing system includes a software programmable thermal management IC with off-chip sensor input and multiple thresholds. This is a desirable option because it provides increased flexibility and performance. Performance is enhanced because the sensing element (e.g., a junction diode) is located separate from the thermal management IC and is typically located on the CPU die. The thermal management IC typically connects to two pins on the CPU to access the sensing element. This allows the temperature measurement to be much more accurate because of a better thermal coupling between the CPU and the sensing element while allowing the system designer more flexibility in where the thermal management IC is located within the information processing system.

SUMMARY

It has been discovered that a thermal management technique using a software and hardware programmable integrated circuit configured to receive a remote temperature sensing signal provides the advantages of remote temperature sensing, the flexibility of software programmability, and the reliability of hardware programmability. Providing coexistent hardware and software based thermal management provides a temperature alarm with a software selectable thresholds and a critical temperature alarm with a hardware programmable threshold which requires no software supervision and is, therefore, fail-safe in the event of software malfunction, and which uses no external components such as resistors for programming. A user-programmable threshold is non-volatile in the event of power loss. The integrated circuit can be used alone or in conjunction with a software-controlled alarm system. The integrated circuit can interface to an off-chip and/or on-chip sensor element. Such a thermal management technique and circuit therefor may be in compliance with the ACPI standard.

In one embodiment, an apparatus for monitoring a thermal state of a system includes a thermal management integrated circuit (IC). The thermal management IC is coupled to receive a remote temperature signal. The remote temperature signal is indicative of a system temperature. The thermal management IC includes a software programmable temperature threshold setpoint, and a hardware programmable temperature critical threshold setpoint.

In another embodiment, a thermal warning circuit for indicating the thermal state of a system includes a thermal management integrated circuit (IC) coupled to receive a first temperature signal. The thermal management IC includes at least one software programmable temperature threshold setpoint and a hardware programmable temperature critical setpoint. The at least one software programmable temperature threshold setpoint is for indicating at least one thermal event temperature. The thermal warning circuit indicates at least one system state when the first temperature signal indicates a temperature above the at least one thermal event temperature. The hardware programmable temperature critical setpoint is for indicating a system critical temperature. The thermal warning circuit indicates a system critical state when the first temperature signal indicates a temperature above that of the system critical temperature.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following discussion is intended to provide a detailed description of at least one example of the invention and should not be taken to be limiting of the invention itself. Rather, any number of variations may fall within the scope of the invention which is defined in the claims following the detailed description.

An information processing system includes hardware based and software based thermal event monitoring and control. A method and apparatus are disclosed herein which provide for monitoring of system temperature(s) and for enabling countermeasures responsive to certain system thermal events. Critical hardware override circuitry including a hardware programmable (e.g., pin strappable or external resistor programmable) temperature setpoint causes a system shutdown when the system reaches a certain critical temperature indicating thermal runaway. Also, software control of software programmable temperature setpoint(s) is provided to enable various countermeasures responsive to the system temperature rising above the temperatures indicated by the software programmable temperature setpoints. Various exemplary countermeasures include passive cooling such as throttling back the speed of a microprocessor, active cooling such as turning on or controlling the speed of a fan or fans, and even critical measures such as ordering the operating system to conduct an orderly shutdown of the system.

Figure 1:
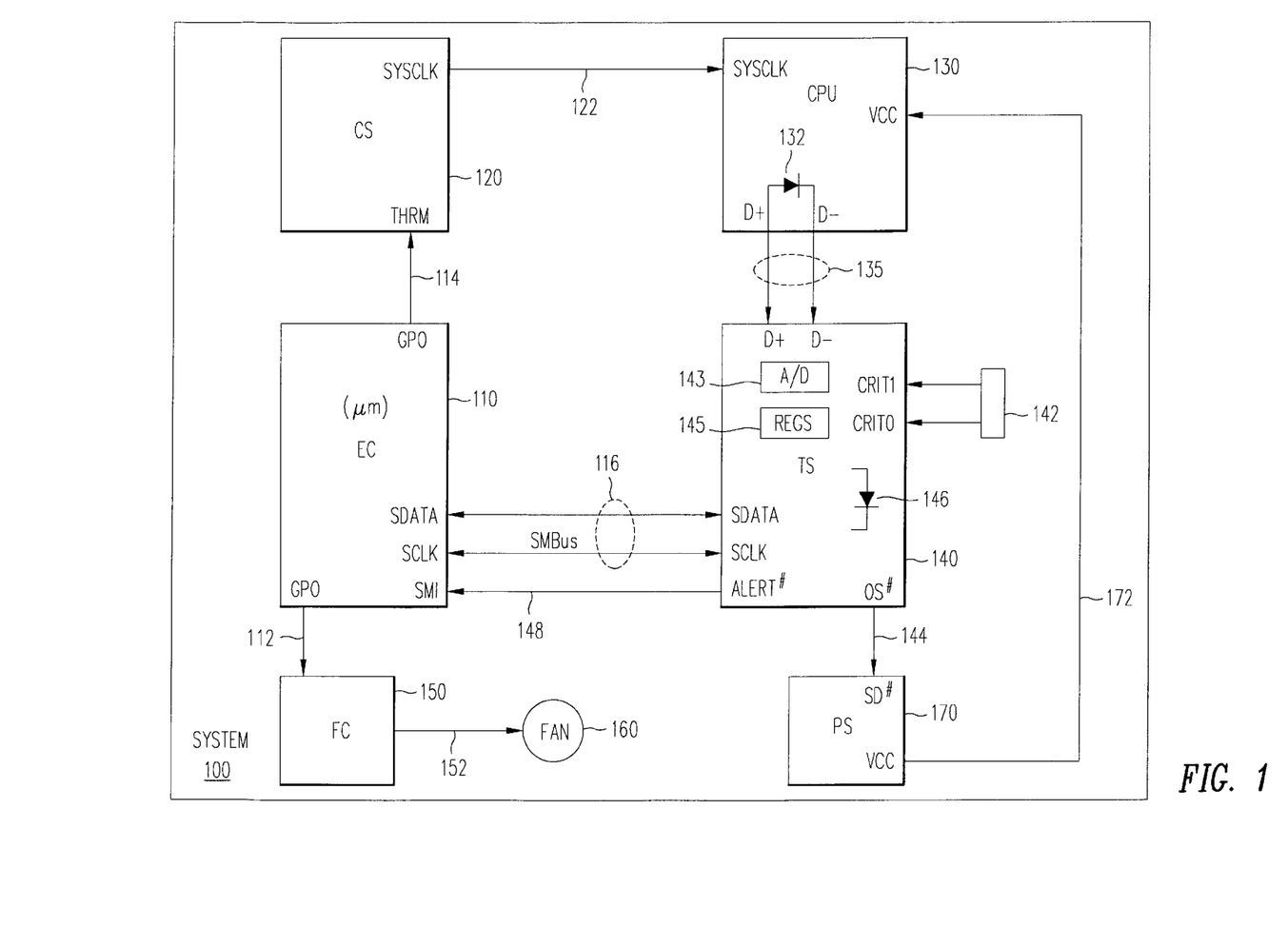
FIG. 1 is a block diagram of an embodiment of an information processing system in accordance with the invention.

Referring to FIG. 1, information processing system 100 includes embedded controller (EC) 110, host CPU chipset (CS) 120, CPU 130, thermal management IC (TS) 140, jumper 142, brushless DC fan controller (FC) 150, brushless DC fan 160, and power supply (PS) 170. CPU 130 includes temperature sensing diode 132.

CPU 130 receives system clock 122 from host CPU chipset 120 and power via $V_{CC}$ coupling 172 from power supply 170. CPU 130 performs typical processing functions in system 100. As a result of the operation of CPU 130, the microprocessor die of CPU 130 can become hot. CPU 130 includes a temperature sensor such as temperature sensing diode 132 for sensing a system temperature (e.g., the temperature of the microprocessor die of CPU 130) and for providing a system temperature signal (e.g., an electrical effect such as an analog voltage $V_D$ across diode nodes D+ and D−) indicative of the system temperature.

Thermal management IC 140 receives analog temperature data in the form of system temperature signal $V_D$ from diode 132 via coupling 135. System temperature signal $V_D$ provides an indication from a temperature sensor that is remote from or external to thermal management IC 140. Accordingly, system temperature $V_D$ is often referred to as an external or remote temperature signal. The analog signal $V_D$ is converted to digital data by analog-to-digital converter 143 of thermal management IC 140 and stored in one of registers 145.

Thermal management IC 140 also includes a temperature sensor such as temperature sensing diode 146 for sensing a local or internal system temperature (e.g., the temperature of the die of thermal management IC 140) and for providing a local or internal system temperature signal (e.g., an electrical effect such as an analog voltage across the diode) indicative of the local or internal system temperature. The analog internal temperature signal is converted to digital data by analog-to-digital converter 143 of thermal management IC 140 and stored in one of registers 145.

Thermal management IC 140 includes various temperature setpoints. For example, thermal management IC 140 includes multiple software temperature setpoints and a hardware temperature setpoint. A temperature setpoint is, for example, an electrical effect and/or circuit value indicative of a temperature that is settable by software and/or hardware. For example, a temperature setpoint may be set by setting one of registers 145 to a particular value by a software program or by a jumper being set to a particular value. Thus, for example, a digital system temperature signal (e.g., the digital representation of the system temperature signals stored in registers 145) may be compared with a digital temperature setpoint (e.g., a value of each of the various setpoints stored in registers 145) to determine if a thermal countermeasure must be implemented.

Thermal management IC 140 receives software instructions for setting software temperature setpoints via SMBus 116. Exemplary software temperature setpoints include an active cooling setpoint and a passive cooling setpoint. When the measured system temperature as indicated by the system temperature signal $V_D$ and/or the digital representation thereof rises above a temperature indicated by a software setpoint, thermal management IC provides an alert signal ALERT# 148 to embedded controller 110.

Responsive to receiving alert signal ALERT# 148, embedded controller 110 initiates any necessary countermeasures depending on the software setpoint crested by the system temperature. For example, if the active cooling setpoint is crested, embedded controller 110 provides a control signal to fan controller 150 to initiate operation of fan 160 or to increase the speed of fan 160. If the passive cooling setpoint is crested, embedded controller 110 provides a control signal to CPU chipset 120 to slow down or "throttle back" the speed of system clock 122.

Thermal management IC 140 further includes two pins CRIT<1:0> for setting critical temperature hardware setpoint. A hardware setpoint is, for example, an electrical effect and/or circuit value indicative of a temperature that is settable by the presence or position of a hardware element or portion thereof. For example, jumper 142 is used to set a critical temperature hardware setpoint to indicate a temperature above which system 100 should be shutdown. When the measured system temperature as indicated by the digital representation of either of the internal or external system temperature signals rises above the critical temperature as indicated by the critical temperature hardware setpoint, thermal management IC 140 provides shutdown signal OS# 144 to power supply 170. Power supply 170 then performs any necessary countermeasures. For example, power supply 170 shuts down the power supplied to CPU 130 via $V_{CC}$ coupling 172. Thus, CPU 130 is shutdown automatically when a system temperature crests the critical hardware temperature regardless of the operating status of software operating on system 100 and/or the operating system of system 100. Thus, if software temperature monitoring fails, hardware temperature monitoring ensures that system 100 will be shutdown if thermal runaway occurs.

Embedded controller 110 is coupled to thermal management IC 140 via SMBus 116 and alert coupling 148. The digital temperature data generated from the diode voltage $V_D$ and stored in registers 145 by thermal management IC 140 is available to embedded controller 110 via SMBus 116. Embedded controller 110 writes the various software temperature setpoints in registers 145 in thermal management IC 140 via the SMBus. Embedded controller 110 provides a throttle microprocessor signal THRM 114 to CPU chipset 120 at a general purpose output (GPO). Embedded controller 110 provides fan control signals such as on/off signals and/or fan speed control signals to fan controller 150 via GPO coupling 112.

Embedded controller 110 receives alert signal ALERT# 148 from thermal management IC 140 at a system management interrupt (SMI) input. If the digital temperature data indicates that a system temperature exceeds any of the temperatures indicated by the software temperature setpoints, alert signal ALERT# 148 is asserted. The assertion of alert signal ALERT# 148 causes an interrupt of embedded controller 110. Embedded controller 110 interacts with thermal management IC 140 over SMBus 116 to determine the type of software setpoint which was crested. The overall policy is programmed into the embedded controller 110 per ACPI guidelines. For example, embedded controller 110 determines whether to throttle the CPU system clock 122 (via the THRM pin of CPU chipset 120) due to the passive cooling temperature setpoint being crested, begin/increase active cooling by fan 160 due to the active cooling temperature setpoint being crested, or both.

Fan controller 150 turns fan 160 on and/or increases the speed of fan 160 responsive to receiving corresponding fan control signals from embedded controller 110 if the active cooling software setpoint has triggered an interrupt of embedded controller 110. Fan controller 150 controls the operation of fan 160 via coupling 152 in a manner well known in the art.

CPU chipset 120 receives throttle microprocessor signal THRM 114 from embedded controller 110, and provides a system clock SYSCLK 122 to CPU 130. System clock SYSCLK 122 may, for example, operate at a first, normal speed when temperatures are within normal ranges. System clock SYSCLK 122 may operate at a second, slower than normal speed if embedded controller provides an indication via throttle microprocessor signal THRM 114 that the measured system temperature has crested a software temperature setpoint such as the passive cooling temperature setpoint.

The above described software controlled thermal monitoring technique including software temperature setpoints works well as long as the software of system 100 is functioning properly. In operation, embedded controller 110 controls a CPU thermal management module with the assistance of CPU chipset 120 and thermal management IC 140. Embedded controller 110 is controlled by the software operating system of system 100. However, even in the case of a software malfunction during high temperature such that the hardware critical setpoint is crested, a hardware-only override is initiated by thermal management IC 140.

Figure 2:
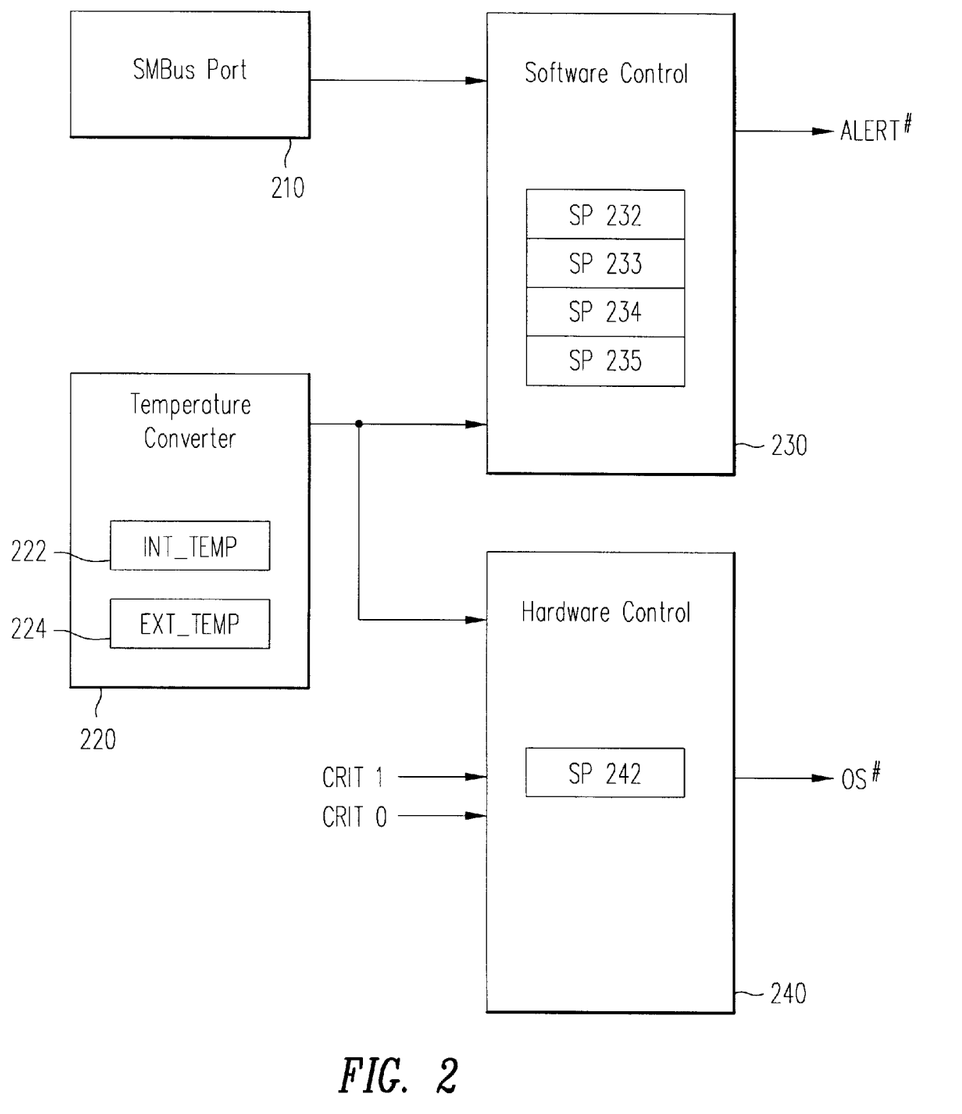
FIG. 2 is a block diagram of an embodiment of a thermal management integrated circuit coupled within the system of FIG. 1.

Referring to FIG. 2, thermal management IC 140 includes SMBus port 210, temperature converter 220, software control block 230 and hardware control block 240. Temperature converter 220, software control block 230 and hardware control block 240 include various registers 222, 224, 232, 233, 234, 235 of registers 145. Embedded controller 110 communicates with thermal management IC 140 via SMBus port 210 to read registers 222, 224 and to read and write registers 232, 233, 234, 235. Registers 222 and 224 are written to by temperature converter 220 which receives temperature signals from temperature sensors 132, 146.

Temperature converter 220 includes internal temperature register INT_TEMP 222 and external temperature register EXT_TEMP 224. Temperature converter 220 receives the internal and external analog temperature signals and alternately converts them to digital data for storing in registers 222, 224 for subsequent comparison with the values of setpoints 232, 233, 234, 235, 242. Temperature registers 222, 224 represent temperatures of the internal and external sensors, respectively, following a conversion cycle (discussed below with reference to operations 310, 330 of FIG. 3). Registers 222, 224 are automatically updated in an alternating manner (see operations 315, 335 of FIG. 3). Each unit value of registers 222, 224 represents one degree Celsius ranging from 130° C. to −65° C. Other values and value steps may be chosen in accordance with the invention.

Hardware control block 240 includes hardware setpoint 142. This register stores the value of the critical setpoint. It is not accessible through the SMBus port and only can be set with the CRIT<1:0> pins. The value in this register determines the OS# event threshold.

Software control block 230 includes software setpoints 232, 233, 234, 235. Software setpoints 232, 233, 234, 235 are written to by software of system 100 via SMBus port 210. For example, software of system 100 can set each of setpoints 232, 233, 234, 235 to a different value indicating a different temperature. Software setpoints 232, 233, 234, 235 store the values of the upper and lower temperature setpoints for event detection such as software temperature setpoint triggering. For example, setpoint 232 is set to a value indicating a temperature above which passive cooling should be implemented. Setpoint 233 is set to a value indicating a temperature below which no passive cooling should be implemented. Setpoint 234 is set to a value indicating a temperature above which active cooling should be implemented. Setpoint 235 is set to a value indicating a temperature below which no active cooling should be implemented. These registers may be written at any time. Each unit value of software setpoints 232, 233, 234, 235 represents one degree Celsius ranging from 130° C. to −65° C. Other values and value steps may be chosen in accordance with the invention.

Hardware setpoint 242 is determined by the values of pins CRIT1 and CRIT0 which are hardware programmed. For example, pins CRIT1 and CRIT0 are hardwired or manually switched to a value indicating a temperature above which system 100 is classified as being critically hot and at which the system should be shutdown. For example, each of CRIT1 and CRIT0 may be set to low, high or open to provide nine hardware programmable critical temperatures. If, for example, CRIT1 is low and CRIT0 is open, a critical hardware temperature setpoint is set to a value indicating a critical setpoint temperature of 90° C. In one embodiment, the hardware programmable critical temperature ranges from 85° C. to 125° C. in 5° C. increments. Other critical temperature values may be selected in accordance with the invention.

Figure 3:
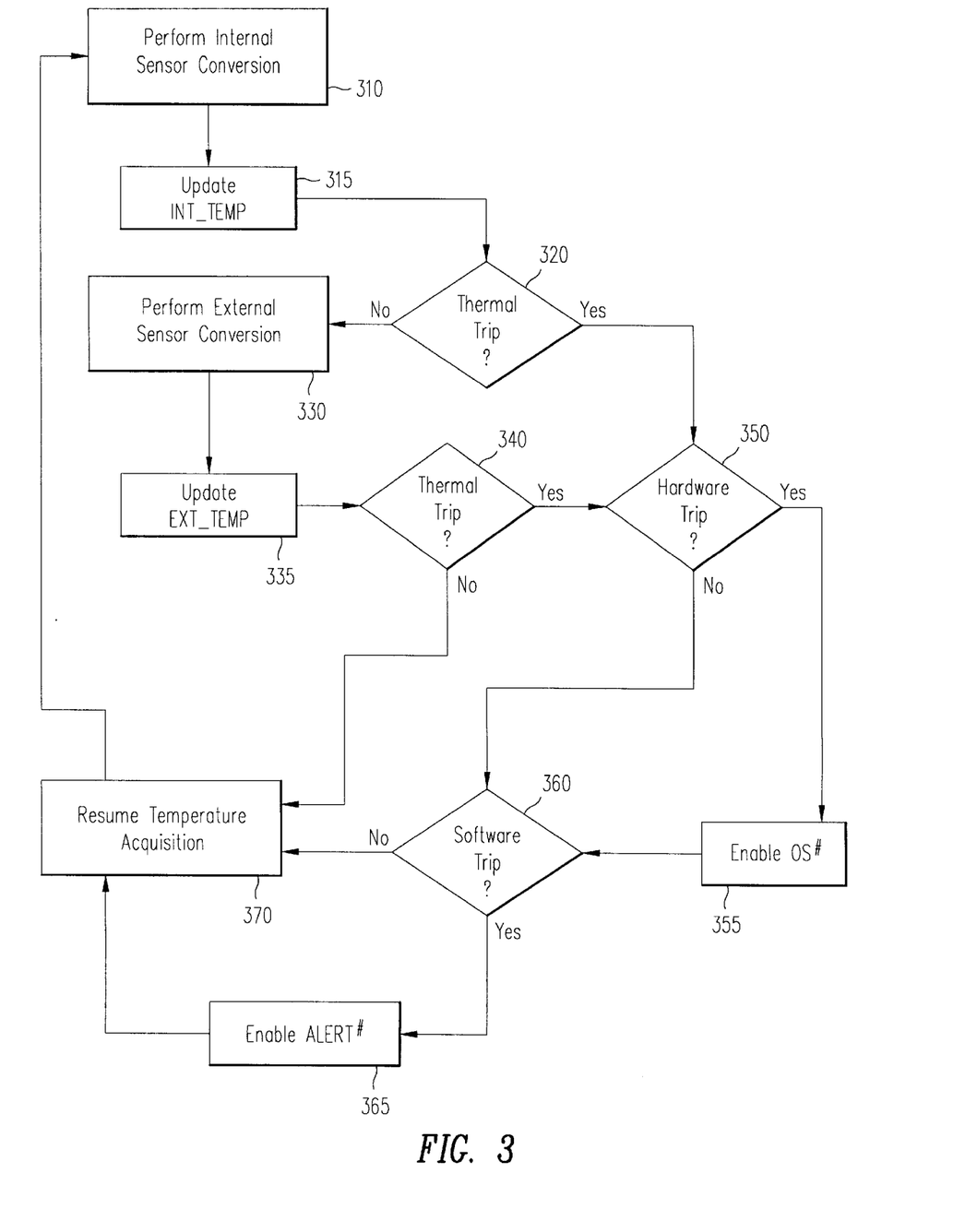
FIG. 3 is a flow chart of an embodiment of a thermal management method in accordance with the invention.

Referring to FIG. 3, during perform internal sensor conversion operation 310, thermal management IC 140 samples the internal system temperature signal from internal temperature sensor 146 onboard thermal management IC 140. Thermal management IC 140 converts the analog internal system temperature signal received from temperature sensor 146 into a digital representation thereof. After perform internal sensor conversion operation 310 and during update INT_TEMP operation 315, internal temperature register INT_TEMP 222 on thermal management IC 140 is updated with the digital representation of the internal system temperature signal.

After update INT_TEMP operation 315 and during thermal trip decision 320, thermal management IC 140 determines if any of the above described temperature setpoints have been crested. If a temperature setpoint has been crested by the internal system temperature, control transitions to hardware trip decision 350. If a temperature setpoint has not been crested by the internal system temperature, control transitions to perform external sensor conversion operation 330.

If no temperature setpoint is crested during thermal trip decision 320, thermal management IC 140 samples the external system temperature signal $V_D$ and converts the analog signal $V_D$ into a digital representation thereof during perform external sensor conversion operation 330. After perform external sensor conversion operation 330 and during update EXT_TEMP operation 335, external temperature register EXT_TEMP 224 on thermal management IC 140 is updated with the digital representation of the system temperature signal $V_D$.

After update EXT_TEMP operation 335 and during thermal trip decision 340, thermal management IC 140 determines if any of the above described temperature setpoints have been crested. If a temperature setpoint has been crested by the external system temperature, control transitions to hardware trip decision 350. If a temperature setpoint has not been crested by the external system temperature, control transitions to resume temperature acquisition operation 370.

During hardware trip decision 350, thermal management IC 140 determines if the hardware temperature setpoint has been crested by the most recently updated temperature signal register (e.g., INT_TEMP or EXT_TEMP). If the hardware temperature setpoint has been crested, system 100 has reached a critical temperature and must be shutdown.

Thermal management IC 140 asserts OS# to effect a shutdown of system 100 during enable OS# operation 355. If the hardware temperature setpoint has not been crested, then control transitions to software trip decision 360.

During software trip decision 360, thermal management IC determines if a software temperature setpoint has been crested by the most recently updated temperature signal register (e.g., INT_TEMP or EXT_TEMP). If a software temperature setpoint has not been crested, then control transitions to resume temperature acquisition operation 370. If a software temperature setpoint has been crested, system 100 has reached a temperature at which countermeasures should be employed to decrease the probability of thermal damage to system 100. Consequently, thermal management IC 140 asserts ALERT# to alert embedded controller 110 of the need to initiate thermal countermeasures during enable ALERT# operation 365. Embedded controller 110 then determines which setpoint temperature has been triggered and which corresponding countermeasure to enable or disable. After enable ALERT# operation 365, control transitions to resume temperature acquisition operation 370.

After resume temperature acquisition operation 370, control of thermal management IC 140 transitions to perform internal sensor conversion 310.

Figure 4:
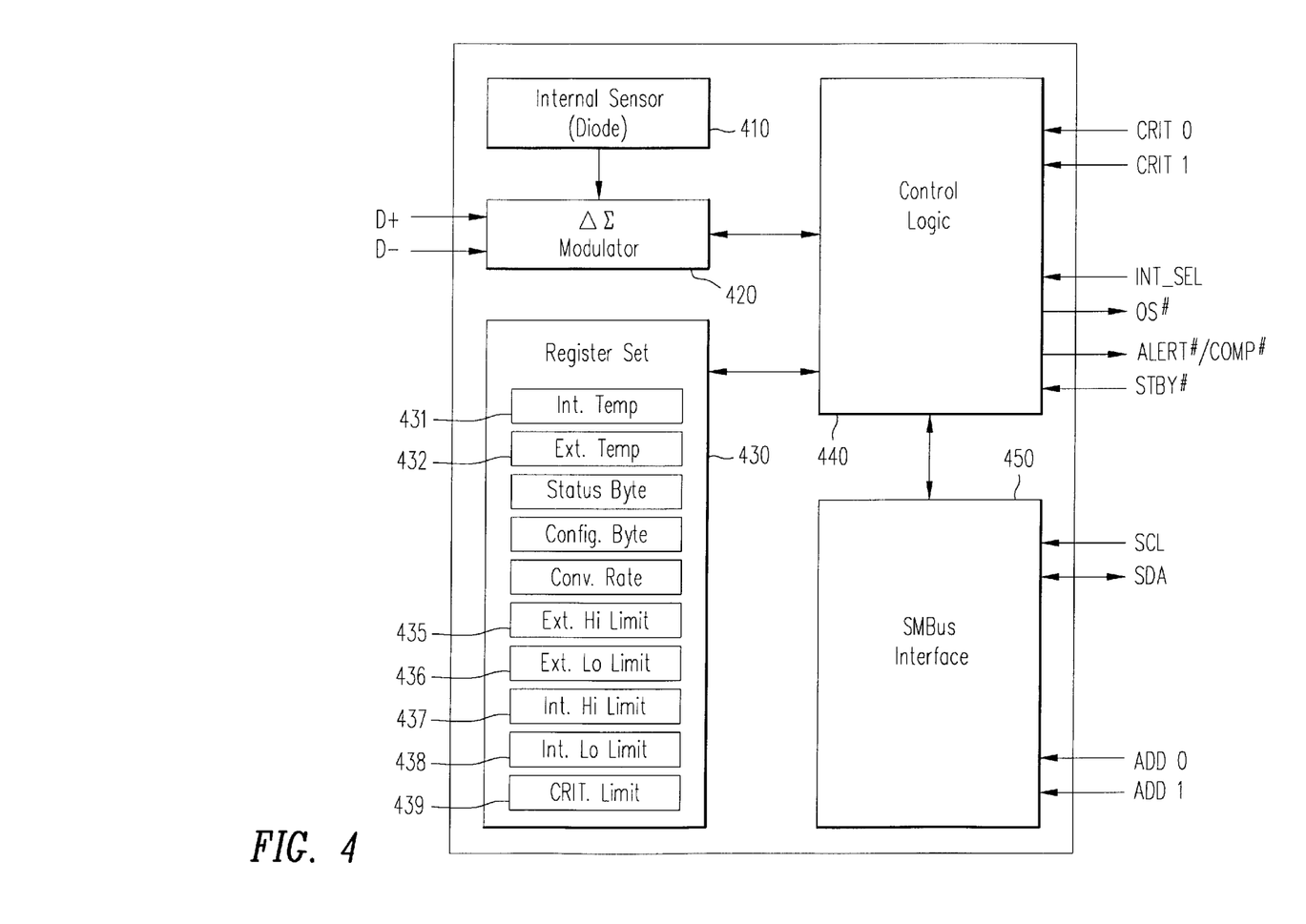
FIG. 4 is a block diagram of an embodiment of a thermal management integrated circuit in accordance with the invention.

One exemplary thermal management IC 140 is shown in FIG. 4. The TC1066 is available from TelCom Semiconductor, Inc. of Mountain View, Calif. The TC1066 is a serially programmable, monolithic temperature sensor optimized for monitoring modern high performance CPUs with on-board integrated thermal diodes. The TC1066 includes internal temperature sensor 410, analog-to-digital converter 420, registers set 430, control logic 440 and SMBus interface 450.

The TC1066 acquires and converts temperature information from two separate temperature sensors (e.g., both silicon junction diodes with a basic accuracy of ±1° C.). One temperature sensor 410 is located on the TC1066 die; another, external temperature sensor is coupled to the TC1066 via inputs D+ and D−. The external temperature sensor may be located on another IC die such as a microprocessor die. The TC1066 includes its own on-board thermal sensor for temperature reference purposes. Analog-to-digital converter 420 alternately converts temperature data from the two sensors and stores them separately in registers 431, 432. The temperature data is converted from the CPU's temperature sensor (e.g., a thermal diode) outputs and made available as an 8-bit digital word.

The TC1066 accepts temperature data at external thermal sensor inputs D+, D−. The D+, D− pins are bi-directional pins which couple to the anode and cathode, respectively, of an external temperature sensing diode (e.g., on a microprocessor) and provide the positive and negative A/D inputs, respectively. Current is injected in to the external diode from the TC1066 via pin D+ and sunk from the external diode into the TC1066 through pin D−. The temperature proportional $V_{BE}$ is measured and converted to digital temperature data in analog-to-digital converter 420 of the TC1066. The D− node is kept at approximately 0.7 V above GROUND.

The TC1066 includes four software programmable setpoints 435, 436, 437, 438 and a hardware programmable setpoint 439. An interrupt is generated on the ALERT# pin when temperature moves outside the preset threshold windows in either direction (e.g., when one or more of four preset temperature threshold setpoints are tripped as discussed below). The fifth, independent, hardware programmable setpoint trips its own interrupt (OS#) for an unconditional warning.

The four software setpoints 435, 436, 437, 438 are user-programmable via the SMBus port which is coupled to a standard System Management Bus (SMBus) commonly used in modern computer systems. The system interface includes a slave SMBus port with an ALERT# interrupt output. The SMBus port permits reading the current internal/external temperature, programming the threshold setpoints, and configuring the device. Nine SMBus addresses are programmable for the TC1066, which allows for a multi-sensor configuration.

A separate CRITICAL setpoint is provided through external hardwiring for "failsafe" operation per ACPI guidelines. This hardware setpoint is programmable only via the strapping pins CRIT0 and CRIT1. The CRIT1 and CRIT0 digital input pins determine the temperature threshold for the critical setpoint when the TC1066 is first powered up. They are tied either to ground or to $V_{DD}$, or they may be left floating. The temperature threshold programmed is stored in an internal register and compared to the current temperature (similar to the software setpoints). However if the critical hardware setpoint is crossed, a separate output (OS#) becomes active and triggers a critical shutdown event.

The TC1066 includes a low-power, standby mode. A standby command may be sent via the SMBus or by signaling a standby input pin to activate a low-power standby mode. If the standby input pin is pulled low, the TC1066 unconditionally enters its low-power standby mode, thereby minimizing the current drawn by the TC1066 thermal management IC. In standby mode, temperature acquisition is suspended. The analog-to-digital conversion process of the temperature signals is halted, and the temperature data registers are frozen, but the ALERT and OS signals remain functional. The TC1066's SMBus interface remains active, and all registers may be read from and written to normally. Address selection inputs allow up to nine TC1066s to share the same 2-wire SMBus for multi-zone monitoring.

All registers can by read by the host. Both polled and interrupt driven systems are easily accommodated. The TC1066 thermal management IC provides the advantages of small size, low installed cost, and ease of use in implementing sophisticated system thermal management schemes such as ACPI.

The TC1066 implements temperature setpoints for indicating when a system temperature exceeds certain temperatures and for indicating when a system temperature drops below certain other temperatures. For example, the ALERT# output of the TC1066 will be asserted and latched when any of the following occurs: a measured thermal management IC temperature equals or exceeds an internal temperature high limit; a measured thermal management IC temperature equals or drops below an internal temperature low limit; a measured external temperature (e.g., a microprocessor temperature) equals or exceeds an external temperature high limit; a measured external temperature equals or drops below an external temperature low limit; an external temperature sensing diode open or short circuit is detected. Internal high limit register 435 and internal low limit register 436 are compared with the internal temperature register 431, and external high limit register 437 and external low limit register 438 are compared with external temperature register 432.

Figure 5:
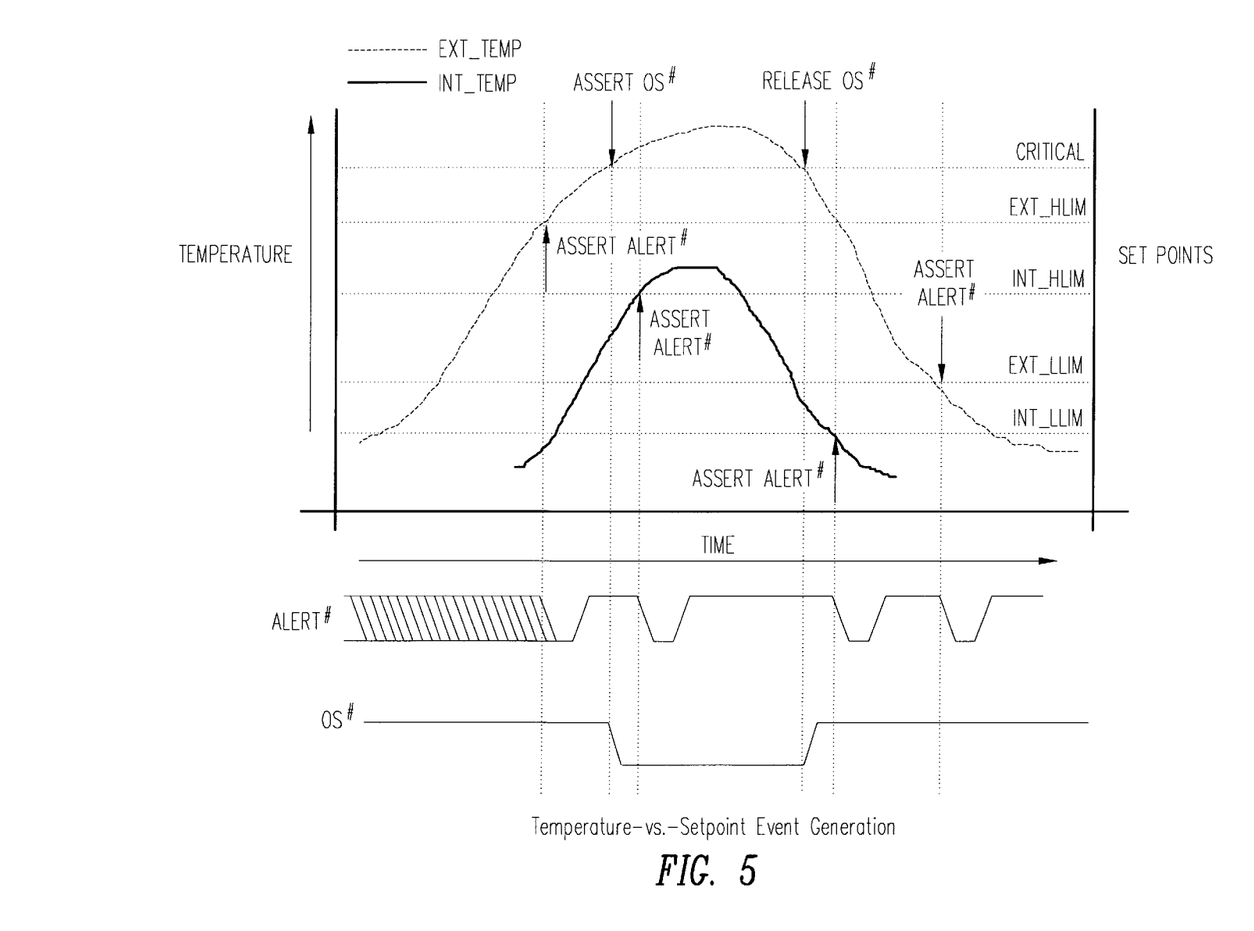
FIG. 5 shows a graph of temperature and thermal event occurrence over time of a system in accordance with the invention.

FIG. 5 shows changing system temperatures over time and the consequent triggering of setpoints. As shown, EXT_TEMP represents an external temperature measured by an external temperature sensor such as a diode 132, and INT_TEMP represents an internal temperature measured by temperature sensor 510.

The OS# open collector output is a low-true digital output which asserts when either the internal thermal management IC temperature or an external temperature rips the CRITICAL setpoint. This interrupt cannot be masked.

The combination of software and hardware thermal management provides for a higher performance and more reliable system. New microprocessors have on-chip thermal sense diodes which allow for excellent thermal coupling and response times. However, typically, only one sensor IC can connect to it. Because separate hardware and software sensors would require that one be compromised with respect to thermal coupling because it would not be directly connected to the CPU's thermal diode, an integrated hardware/software sensor such as the TC1066 makes excellent use of the thermal diode on the CPU chip.

The above description is intended to describe at least one embodiment of the invention. The above description is not intended to define the scope of the invention. Rather, the scope of the invention is defined in the claims below. Thus, other embodiments of the invention include various modifications, additions, and/or improvements to the above description.

For example, although one embodiment uses the TC1066, other embodiments can be alternately implemented using multiple IC's and several external passive components (e.g., thermistors, resistors, etc.). For example, one IC would manage the software control via the operating system and the other IC would operate in a stand-alone fashion. Such an embodiment is not currently preferred because either of the hardware and software components may be compromised in thermal response performance. There is no other currently known effective method to use the CPU's on-board sensor diode for both software and hardware control.

In the above described embodiment, the exemplary software temperature setpoints include a passive cooling setpoint and an active cooling setpoint. Another possible exemplary software temperature setpoint is a critical software temperature setpoint. Because system 100 already includes a critical hardware temperature setpoint, such a critical software temperature setpoint would provide a redundant critical setpoint to further protect system 100 in case of thermal runaway. If the critical software temperature setpoint is crested, embedded controller 110 provides a control signal to CPU chipset 120 to initiate a software and/or operating system controlled shutdown of CPU 130 and system 100. In this example, the critical hardware temperature setpoint provides a fail safe mechanism in case the critical software temperature setpoint countermeasure is not implemented due to software failure due to thermal runaway.

In the above described embodiment, software setpoints 232, 233, 234, 235 indicate a passive cooling on temperature, a passive cooling off temperature, an active cooling on temperature and an active cooling off temperature, respectively. Additional and/or alternative setpoints may be included in thermal management IC 140 in accordance with the invention. For example, an additional setpoint or a setpoint in place of setpoints 233, 235 may be set to a value indicating a temperature below which no thermal countermeasures should be implemented due to system 100 being at a normal operating temperature. Such a setpoint provides a lower limit temperature below which all countermeasures are discontinued to save power by shutting down fans or increase performance by increasing processing speeds. Also, the above discussed critical software setpoint may be implemented.

In one embodiment, system 100 is a computer system such as a personal computer system. Other embodiments may include different types of computer systems. Computer systems are information handling systems which can be designed to give independent computing power to one user or a plurality of users. Computer systems may be found in many forms including but not limited to mainframes, minicomputers, workstations, servers, personal computers, notepads and embedded systems. A typical computer system includes at least one processing unit, associated memory and a number of input/output (I/O) devices. A computer system processes information according to a program and produces resultant output information via the I/O devices. A program is a list of internally stored instructions such as a particular application program and/or an operating system. A software module may includes a program. The programs that control the operation of a computer system are commonly referred to as software applications or simply software.

Those skilled in the art will recognize that boundaries between logic blocks are merely illustrative and that alternative embodiments may merge logic blocks or impose an alternate decomposition of functionality upon various logic blocks. Furthermore, those skilled in the art will recognize that boundaries between the functionality of the above described operations merely illustrative. The functionality of multiple operations may be combined into a single operation, and/or the functionality of a single operations may be distributed in additional operations in accordance with the invention. Moreover, alternative embodiments may include multiple instances of a particular component.

The embodiment shown is an ACPI-compliant thermal management implementation. Other embodiments may or may not be ACPI-compliant.

The above description is not intended to present an exhaustive list of embodiments of the invention. Although an attempt has been made to outline some exemplary variations, other variations are within the scope of invention as defined in the claims below.

What is claimed is:

1. An apparatus for monitoring a thermal state of a system, the apparatus comprising:
    a thermal management integrated circuit (IC) coupled to receive a remote temperature signal indicative of a system temperature, the thermal management IC including
        a software programmable temperature threshold setpoint; and
        a hardware programmable temperature critical threshold setpoint.

2. The apparatus of claim 1 further comprising:
    a remote temperature sensor coupled to provide the remote temperature signal to the thermal management IC.

3. The apparatus of claim 2 wherein the remote temperature sensor is embedded on a temperature sensitive integrated circuit die.

4. The apparatus of claim 2 wherein the remote temperature sensor is embedded on a microprocessor die.

5. The apparatus of claim 1 wherein the software programmable temperature threshold setpoint is one of a plurality of software programmable temperature threshold setpoints of the thermal management IC.

6. The apparatus of claim 5 wherein the plurality of software programmable temperature threshold setpoints comprises:

a first setpoint for indicating a first setpoint temperature, the thermal management IC indicating active cooling when the remote temperature signal indicates a temperature above that of the first setpoint temperature; and a second setpoint for indicating a second setpoint temperature, the thermal management IC indicating passive cooling when the remote temperature signal indicates a temperature above that of the second setpoint temperature.

7. The apparatus of claim 6 wherein the plurality of software programmable temperature threshold setpoints further comprises:

a third setpoint for indicating a third setpoint temperature, the thermal management IC indicating a system critical state when the remote temperature signal indicates a temperature above that of the third setpoint temperature.

8. The apparatus of claim 6 wherein
    the thermal management IC indicates a system cool state when the remote temperature signal indicates a temperature below that of each of the first and second setpoint temperatures.

9. The apparatus of claim 6 wherein the plurality of software programmable temperature threshold setpoints further comprises:

a fourth setpoint for indicating a fourth setpoint temperature, the thermal management IC indicating discontinuation of active cooling when the remote temperature signal indicates a temperature below that of the fourth setpoint temperature; and a fifth setpoint for indicating a fifth setpoint temperature, the thermal management IC indicating discontinuation of passive cooling when the remote temperature signal indicates a temperature below that of the fifth setpoint temperature.

10. The apparatus of claim 9 wherein the plurality of software programmable temperature threshold setpoints further comprises:

a sixth setpoint for indicating a sixth setpoint temperature, the thermal management IC indicating discontinuation of the system critical state when the remote temperature signal indicates a temperature below that of the sixth setpoint temperature.

11. The apparatus of claim 5 wherein the plurality of software programmable temperature threshold setpoints comprises:

a first setpoint for indicating a first setpoint temperature, the thermal management IC indicating a thermal countermeasure initiation event when the remote temperature signal indicates a temperature above that of the first setpoint temperature; and a second setpoint for indicating a second setpoint temperature, the thermal management IC indicating a thermal countermeasure discontinuation event when the remote temperature signal indicates a temperature below that of the second setpoint temperature.

12. The apparatus of claim 11 further comprising:
    a temperature register comprised within the thermal management IC, the temperature register storing a digital representation of the remote temperature signal;
    a controller for determining which one of a plurality of thermal countermeasures to initiate depending on the digital representation of the remote temperature signal stored in the temperature register when the thermal management IC indicates a thermal countermeasure initiation event and for determining which one of the plurality of thermal countermeasures to discontinue depending on the digital representation of the remote temperature signal stored in the temperature register when the thermal management IC indicates a thermal countermeasure discontinuation event.

13. The apparatus of claim 12 wherein the plurality of thermal countermeasures includes:

active cooling; and passive cooling.

14. The apparatus of claim 13 wherein the plurality of thermal countermeasures further includes a critical system shutdown.

15. The apparatus of claim 1 further comprising:

a local temperature sensor comprised within the thermal management IC, the local temperature sensor coupled to provide a local temperature signal indicative of a local temperature of the thermal management IC.

16. The apparatus of claim 1 wherein the software programmable temperature threshold setpoint is one of a plurality of software programmable temperature threshold setpoints of the thermal management IC, the plurality of software programmable temperature threshold setpoints comprising:

a first setpoint for indicating a first setpoint temperature, the thermal management IC indicating a thermal countermeasure initiation event when the remote temperature signal indicates a temperature above that of the first setpoint temperature;

a second setpoint for indicating a second setpoint temperature, the thermal management IC indicating a thermal countermeasure discontinuation event when the remote temperature signal indicates a temperature below that of the second setpoint temperature;

a third setpoint for indicating a third setpoint temperature, the thermal management IC indicating a thermal countermeasure initiation event when the local temperature signal indicates a temperature above that of the third setpoint temperature; and a fourth setpoint for indicating a fourth setpoint temperature, the thermal management IC indicating a thermal countermeasure discontinuation event when the local temperature signal indicates a temperature below that of the fourth setpoint temperature.

17. The apparatus of claim 16 further comprising:

a remote temperature register comprised within the thermal management IC, the remote temperature register storing a digital representation of the remote temperature signal;

a local temperature register comprised within the thermal management IC, the local temperature register storing a digital representation of the local temperature signal;

a controller for determining which one of a plurality of thermal countermeasures to initiate depending on one of the digital representations of the remote and local temperature signals when the thermal management IC indicates a thermal countermeasure initiation event and for determining which one of the plurality of thermal countermeasures to discontinue depending on the digital representations of the remote and local temperature signals when the thermal management IC indicates a thermal countermeasure discontinuation event.

18. The apparatus of claim 17 wherein the plurality of thermal countermeasures includes:

active cooling; and passive cooling.

19. An thermal warning circuit for indicating the thermal state of a system, the thermal warning circuit comprising:

a thermal management integrated circuit (IC) coupled to receive a first temperature signal, the thermal management IC including at least one software programmable temperature threshold setpoint for indicating at least one thermal event temperature, the thermal warning circuit indicating at least one system state when the first temperature signal indicates a temperature above the at least one thermal event temperature; and a hardware programmable temperature critical setpoint for indicating a system critical temperature, the thermal warning circuit indicating a system critical state when the first temperature signal indicates a temperature above that of the system critical temperature.

20. The thermal warning circuit of claim 19 further comprising:

a first temperature sensor on a temperature sensitive integrated circuit, the first temperature sensor providing the first temperature signal; and wherein the thermal management IC is coupled to receive the first temperature signal from the temperature sensitive integrated circuit.

21. The thermal warning circuit of claim 20 wherein the temperature sensitive integrated circuit is a microprocessor.

22. The thermal warning circuit of claim 19 wherein the thermal management IC includes a second temperature sensor on the thermal management IC, the second temperature sensor providing a second temperature signal;

the thermal warning circuit indicating at least one system state when at least one of the first and second temperature signals indicates a temperature above the at least one thermal event temperature; and the thermal warning circuit indicating a system critical state when at least one of the first and second temperature signals indicates a temperature above that of the system critical temperature.

23. An computer system comprising:

a microprocessor, the microprocessor including a microprocessor temperature sensing circuit for sensing a microprocessor temperature, the microprocessor temperature sensing circuit providing a microprocessor temperature signal indicative of the microprocessor temperature;

a thermal management IC, the thermal management IC being coupled to receive the microprocessor temperature signal from the microprocessor temperature sensing circuit of the microprocessor, the thermal management IC including at least one software programmable temperature threshold setpoint for indicating at least one thermal event temperature, the thermal warning circuit indicating at least one microprocessor temperature state when the microprocessor temperature signal indicates a temperature above the at least one thermal event temperature; and a hardware programmable temperature critical setpoint for indicating a system critical temperature, the thermal warning circuit indicating an microprocessor critical temperature state when the microprocessor temperature signal indicates a temperature above that of the system critical temperature.

24. The computer system of claim 23 wherein the thermal management IC includes an on-chip temperature sensing circuit; and a temperature signal processing circuit coupled to receive the microprocessor temperature signal from the microprocessor temperature sensing circuit and a thermal management IC temperature signal from the on-board temperature sensing circuit, the temperature signal processing circuit converting each of the microprocessor temperature signal and the thermal management IC temperature signal to digital values for comparison with the at least one software programmable temperature threshold setpoint and the hardware programmable temperature critical setpoint.

25. The computer system of claim 24 wherein the thermal management IC includes at least one strap pin for hardware programming hardware programmable temperature critical setpoint.

* * * * *